COLOR TELEVISION SYSTEM

Filed May 20, 1950 3 Sheets-Sheet 1

INVENTOR.
SOLO ROTH
BY Ralph W. E. Bitner
ATTORNEY

INVENTOR.
SOLO ROTH
BY Ralph W. E. Bitner
ATTORNEY

June 3, 1952 S. S. ROTH 2,598,941

COLOR TELEVISION SYSTEM

Filed May 20, 1950 3 Sheets-Sheet 3

INVENTOR.
SOLO ROTH

BY Ralph W. E. Bitner

ATTORNEY

Patented June 3, 1952 2,598,941

UNITED STATES PATENT OFFICE 2,598,941

COLOR TELEVISION SYSTEM

Solo S. Roth, Yonkers, N. Y.

Application May 20, 1950, Serial No. 163,292

6 Claims. (Cl. 178—5.4)

This invention relates to color television systems, and has particular reference to a novel type of cathode ray tube and an optical system for transforming the received color images into a color picture.

Many color television systems have been disclosed and developed. One system comprises three cathode ray picture tubes, one for each primary color. This system requires at least three reflecting mirrors and filters to blend the three images together and project a composite color picture. The adjustment is difficult to make and maintain. Another color television system uses a color wheel to interpose color filters in front of a single cathode ray tube which produces color frames in sequence. The frame sequential system is not well developed for subjects which include fast moving objects since there is usually a color fringe before and behind the fast moving image.

Other forms of color television receivers include small filter strips or colored spots mounted at or near the fluorescent screen. These systems are also hard to adjust and maintain. Any distortion in the fluorescent image produces faulty color values.

The present invention uses three wide color strips in conjunction with a fluorescent screen at the end of a cathode ray tube. The cathode ray beam is focussed into a wide thin plane which sweeps over the color strip and produces fluorescence in conformity with the color value transmitted by the video signal. By properly adjusting the deflection circuits and other circuit components the system can be made to receive and reproduce colored pictures which are transmitted in accordance with the following systems: three channel simultaneous, CTI line sequential, geld sequential, and dot sequential. The system, as will be evident from the following description, is not subject to the faults of distortion and precise adjustment which are present in prior art systems.

One of the objects of the invention, therefore, is to provide an improved color television system which avoids one or more of the disadvantages and limitations of prior art systems.

Another object of the invention is to reduce the cost of color television receiving equipment by providing a single, small cathode ray tube and a simple optical system.

Another object of the invention is to increase the brightness of color television pictures by providing a more efficient cathode ray tube.

Another object of the invention is to provide a projection system for the received color picture so that it can be enlarged and projected on a screen for more convenient viewing.

Another object of the invention is to provide a flexible color television system which can be arranged to receive video signals produced in accordance with any one of a number of color television systems.

Still another object of the invention is to provide an improved color television system which will handle higher frame frequencies and faster scanning, thereby permitting the present color systems to be improved and refined.

One feature of the invention includes a cathode ray tube having a focussing arrangement for producing a cathode beam which is focussed into a vertical line in the plane of the fluorescent screens. Three wide fluorescent screens are mounted at one end of the tube and are scanned by the cathode beam in sequence. Colored filter strips mounted adjacent to the screens produce light values in accordance with a received video signal. An optical system gathers and focusses the light from the color strips into a composite color line which is spread into a picture by a rotating mirror.

Another feature of the invention includes a series of control electrodes positioned adjacent to the fluorescent screens. Varying potentials are supplied to the control electrodes to vary the cathode ray intensity in accordance with the received video signal.

The optical features of the invention include a combination of cylindrical lenses and spherical lenses which collect the broad bands of color and compress and merge them at a slit diaphragm and then focus the line on a screen. A rotary mirror spreads the line into a complete color picture.

For a better understanding of the present invention, together with other and further objects thereof, reference is made to the following description taken in connection with the accompanying drawings.

Figure 1:
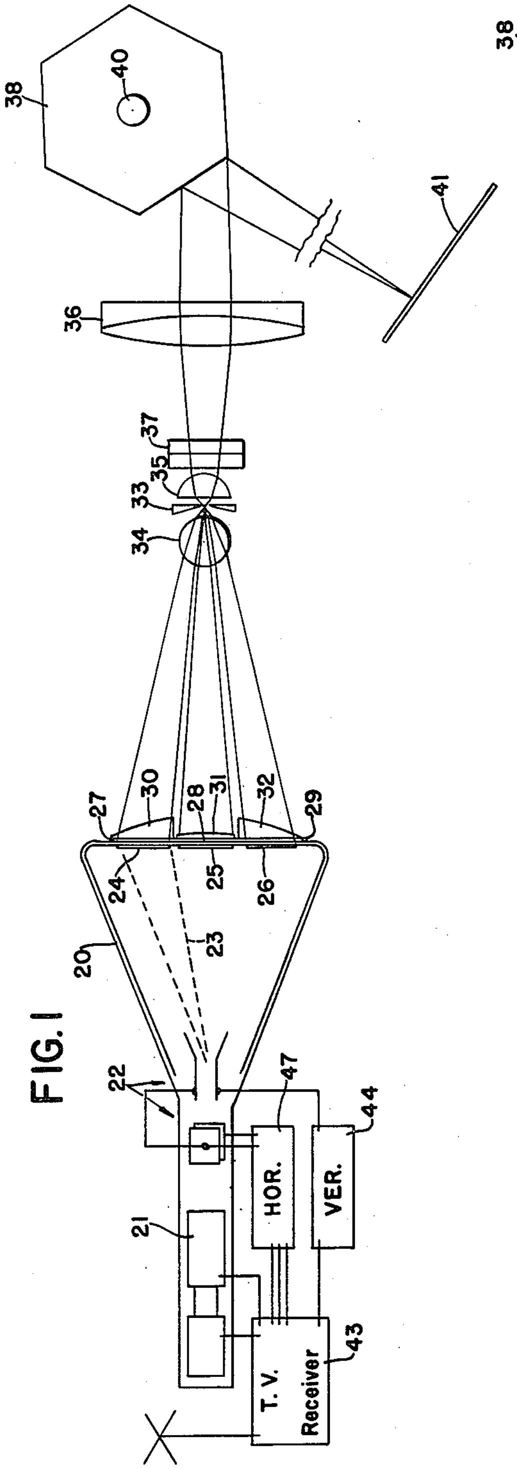
Fig. 1 is a schematic diagram showing one form of the television tube connected so as to receive color television signals classified as "field sequential" and "line sequential."

Referring now to Figs. 1, 2, 3, and 4, a cathode ray tube 20 encloses an electron gun 21 and deflection plates 22. The electron gun 21 has a slit opening instead of a small hole and produces a fan shaped electron beam 23, the cross section of which is shown on the red color strip in Fig. 4. At the large end of the tube three broad strips of fluorescent material 24, 25, and 26 are secured, and on the outside of the tube three color filters 27, 28, and 29 are mounted to cover the flourescent strips and produce the colors red, green, and blue. The color filters may be eliminated if the fluorescent material is selected to give the correct color values without filtering action.

Adjoining the filters are three cylindrical lenses 30, 31, and 32 which collect and direct the light from the fluorescent strips toward a slit diaphragm 33. These lenses are field lenses and do not contribute much to the focussing action. A cylindrical focussing lens 34, which may be a rod of circular cross section, focusses the light in a fine line on the slit diaphragm 33 where all three colors are combined.

Since the function of lenses 30, 31, 32, and 34 is to collect and merge light rays at a slit, the aberrations of the lenses are not important except that if the aberrations are too large a small percentage of light will be lost.

On the other side of the slit a field lens 35 collects the widely divergent light rays from the slit and sends a divergent beam toward a cylindrical lens 36. At this point the light beam comprises a collection of rays which have been focussed in the vertical direction but which have been allowed to spread in the horizontal direction. To collect and focus the horizontal rays a cylindrical lens 37 is added adjacent the field lens 35. Lens 37 may be a simple cylindrical lens as shown, but if greater precision is desired, a number of cylindrical lenses, positive and negative, may be added to correct aberrations and produce a more exact image of the fluorescent screen.

A rotating mirror 38 mounted on a shaft 40 is employed to spread the flat beam of light rays into a color television picture in a manner which is well known in the television art. As each mirror face turns while reflecting the beam, the image on a screen 41 is drawn out to picture height. Any number of mirror faces may be used provided the speed of the mirror drum is synchronized to agree with the interlaced field sequence of the received signal. A synchronous motor 42 drives the drum 38.

Figure 2:
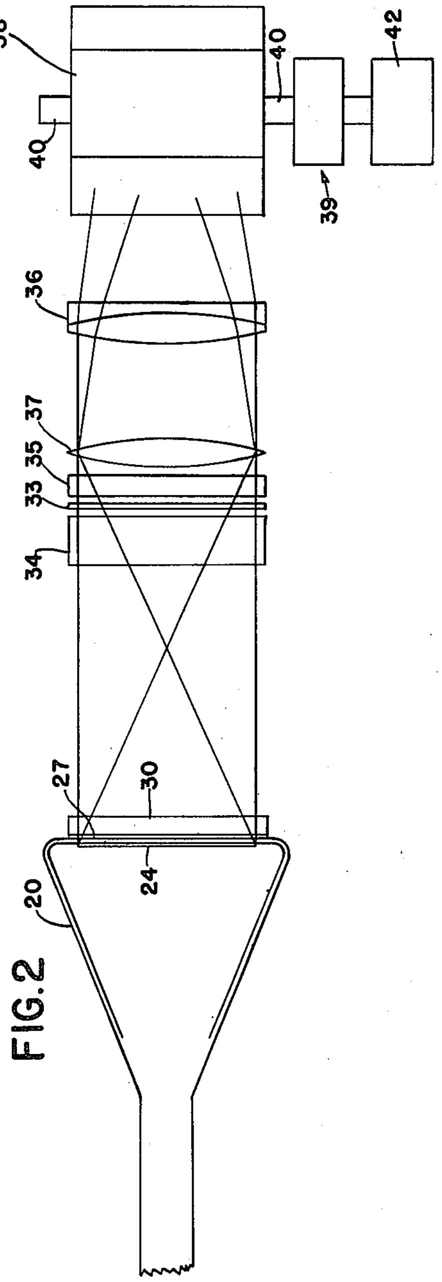
Fig. 2 is a plan view of the arrangement shown in Fig. 1 to show the optical system in greater detail.

The optical system shown in Figs. 1 and 2 shows no means of correcting for chromatic aberration. All the lenses shown may be made up of components and corrected for color in the usual manner, but it is easier and cheaper to alter the curvature of lenses 30, 31, and 32 to provide for color correction.

The three color beams, red, green, and blue, are merged at the slit diaphragm 33 because of the prism components in field lenses 30, 31, and 32. When the light leaves the slit 33 it again separates into three color beams and such separation continues through the remainder of the optical system until the light is finally focussed on the screen 41 where the colors are again merged into a single line.

It is obvious that some of the lenses in the above described optical system may be replaced with cylindrical or spherical mirrors. The exchange of mirrors for lenses is a well known expedient which is often done to save space or otherwise change the dimensions of an optical system.

Figures 3, 4, 5:
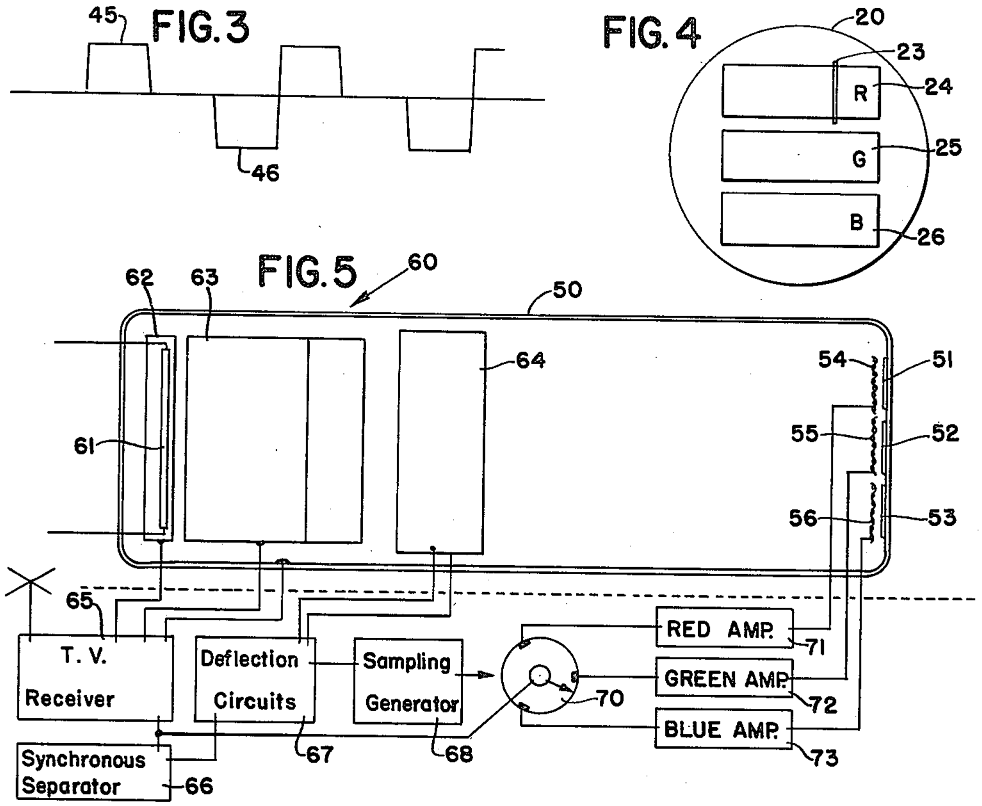
Fig. 3 is a graph showing the type of voltage wave necessary to deflect the cathode ray beam for some of the tube applications.
Fig. 4 is an end view of the cathode ray tube of Fig. 1 and illustrates the method of scanning with a thin cathode beam which covers the width of the phosphor strip.
Fig. 5 is a side view of an alternate type of television receiving tube which employs three screens, each adjacent to a color phosphor. A schematic diagram of connections is shown for receiving video signals classified as "dot sequential".

The above described arrangement is designed to receive and reproduce color television signals which are of the field sequential and line sequential type. If the field sequential signals are to be received, a television receiver 43 receives the video signal which is single channeled and contains in sequence complete color fields of red, green, and blue. If interlace is used, a total of six fields may be required before the entire color picture is produced. While the red picture information is being received the vertical deflection circuit 44 produces the first component 45 of a wave as shown in Fig. 3. This voltage is applied to the vertical deflection plates 22 and the cathode beam 23 scans the red fluorescent screen 24 until the field is complete. Next, the green field is produced with no voltage on the vertical deflection plates and the green fluorescent screen 25 is scanned. Last, a reverse voltage is applied to the plates (46 in Fig. 3) and the blue screen 26 is scanned.

For the above described type of television signal it will be obvious that the vertical deflection wave must produce voltage pulses, the periods of which are equal to the length of time it takes to scan a complete frame. A horizontal deflection circuit 47 produces the usual saw-toothed wave in the same manner as produced by present monochrome circuits.

If the receiver is to receive and reproduce the type of signals known as "line sequential," the deflection waves have the same shape but the frequency of the vertical wave is increased by a factor equal to the number of color lines in each color picture. A single red line is produced while the voltage pulse 45 (Fig. 3) holds the cathode beam on the red fluorescent screen. Then a green line is produced during the no-voltage interval and then a blue line is produced while the voltage pulse 46 holds the cathode beam on the blue fluorescent screen. This action is repeated until all the lines have been produced.

It has been found by experiment that all normal color values including white may be produced with greater efficiency if the green component is made larger and the blue component is made smaller. The tube described above can be easily modified to make the required adjustment. Green screen 25 is increased in area while blue screen 26 is decreased in area with corresponding adjustments in the lenses 31 and 32.

It will be evident that the usual modulation means for controlling the intensity of the cathode ray will be all that is needed to produce correct color values in the completed picture.

All fluorescent material is actually phosphorescent since the light generated by cathode rays continues to shine after the cathode beam has been turned off or moved to another area. In some television tubes used today, the decay time is equivalent to the time required to scan three picture lines. In the cathode ray tubes used for the above described arrangement, the decay time should be limited to a single picture line, otherwise color fringes will be evident.

Figure 6:
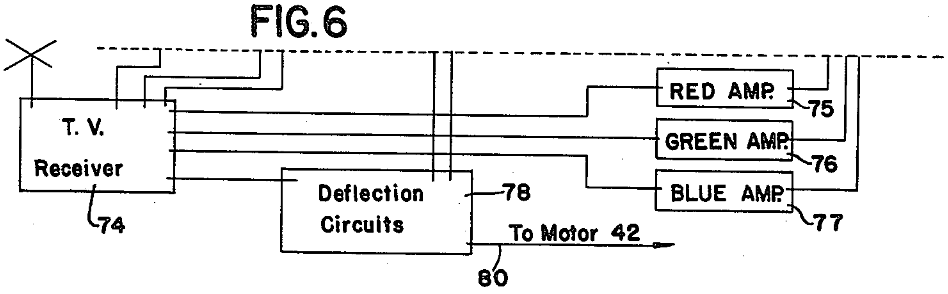
Fig. 6 is a schematic diagram of connections which may be used instead of the connections shown in Fig. 5. This circuit is for receiving video signals classified as "3 channel simultaneous."
Figure 8:
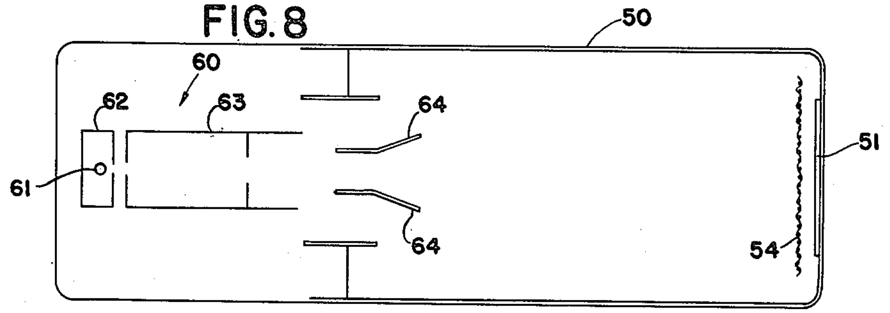
Fig. 8 is a plan view of the television tube shown in Fig. 5.

Referring now to Figs. 5, 6, and 8, an alternate type of television tube comprises an envelope 50 which is cylindrical in shape and has three fluorescent screens 51, 52, and 53 mounted on one of its ends. Three control electrodes 54, 55, and 56 are mounted adjacent to the fluorescent screens and parallel to them. They may be constructed of fine woven wire and must cover the entire area of the fluorescent material. External connections are made to these electrodes so they may be provided with potentials which control the intensity of the cathode rays striking the fluorescent screens.

Some types of cathode ray picture tubes employ an aluminum backing on the fluorescent material. This thin aluminum sheet increases the brightness of the fluorescent light by reflection and performs other desirable functions. The aluminum backing can be used with the above described tube, and when so employed, takes the place of the three control electrodes 54, 55, and 56.

An electron gun 60 is mounted in the other end of the tube and includes a long thin cathode 61 with focussing elements 62 and 63. The electron gun is constructed with long narrow slit diaphragms so that the electrons are focussed on the three fluorescent screens in a thin line which covers all the screens. There is no vertical deflection means and it is not necessary to provide an intensity control of the cathode beam in the electron gun since that function is provided by the three electrodes 54, 55, and 56.

Horizontal deflection is provided by a pair of deflection plates 64 so that the flat cathode beam may scan the entire length of the fluorescent screens.

To receive that type of television signal known as "dot sequential" transmission, a number of auxiliary circuits are necessary. The details of the dot sequence system have been described in Electronics for December 1949 (McGraw-Hill Publishing Co., New York 18, N. Y.). A television receiver 65 receives the video signal plus the various blanking and synchronizing pulses. A synchronous separator 66 develops and amplifies the synchronizing pulses and sends them to a deflection amplifier 67 and a sampling generator 68 which causes the circular deflection of a commutator tube 70.

The commutator tube 70 connects the video signal to three amplifiers 71, 72, and 73 in succession at the frequency of occurrence of an elementary picture area of approximately square shape, called the dot. The picture values so obtained are applied to the three electrodes 54, 55, and 56, which control the intensity of the cathode ray beam. Therefore, as the scanning line moves over the three fluorescent screens, its intensity is varied by the control electrodes to produce elementary areas or dots in red, green, and blue so that at the finish of each line the correct color values have been produced. The cathode ray tube shown in Figs. 5 and 8 is used with the optical system shown in Figs. 1 and 2 to produce a colored picture on a projection screen.

Fig. 6 shows the circuits which may be applied to the tube of Fig. 5 when a three channel simultaneous video signal is being received. A television receiver 74 receives all three color signals and sends them to color amplifiers 75, 76, and 77. The outputs of these amplifiers are connected to electrodes 54, 55, and 56 to control the color values produced by the fluorescent strips. A deflection circuit 78 controls the horizontal deflection of the cathode ray and a motor line 80 can be run from this control circuit to synchronize the motor 42. Similar lines from other deflection or synchronizing circuits can be used to control the motor speed.

The tubes described above were designed primarily for receiving and reproducing colored television pictures. However, there may be times when it is desired to receive monochrome pictures in black and white. This may be done by making minor adjustments in the circuit connections and both of the tubes (Figs. 1, 2, and 4 of Figs. 5 and 8) will then receive the standard monochrome video signals.

To adjust the tube shown in Fig. 1 for black and white pictures all three color filters 27, 28, and 29 are removed. Then the cathode beam scans the three fluorescent screens but produces only values in white and black. The remainder of the system functions in the usual manner.

The tube and circuit shown in Figs. 5 and 8 may be switched to monochrome reception by removing all the color filters and short circuiting the sampling device 70.

The tube of Figs. 5 and 8 and the circuit of Fig. 6 may be switched to monochrome reception by tuning the incoming video wave to any one of the color channels and then connecting the three output wires of amplifiers 75, 76, and 77 together. The result will be a monochrome picture.

Figure 9:
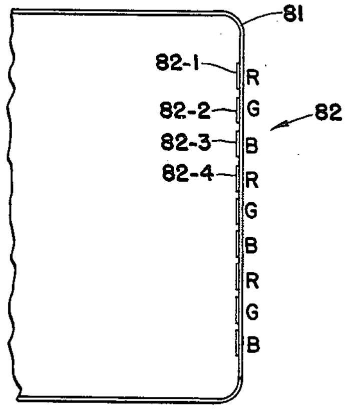
Fig. 9 is a sectional view of the end of a television tube having nine color strips.
Figure 10:
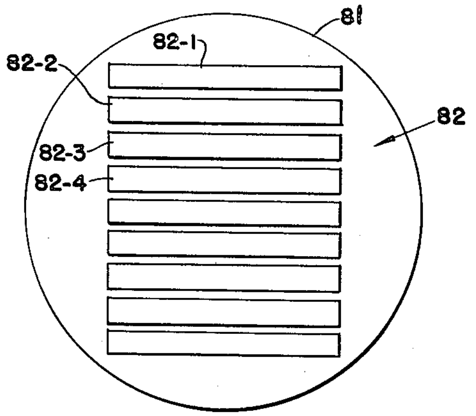
Fig. 10 is an end view of the tube shown in Fig. 9.
Figure 11:
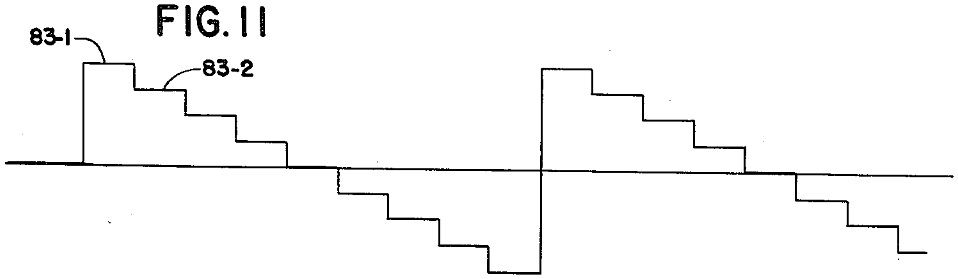
Fig. 11 is a graph of voltage values showing the type of deflection wave necessary for use with the nine-strip tube of Figs. 9 and 10.

In order to distribute the heating effect and to provide against phosphor burn-out, an alternate type of tube has been developed. Figs. 9 and 10 illustrate the arrangement of fluorescent screens. An envelope 81 includes the usual electron gun and deflection means (not shown). At the picture end a collection of nine fluorescent strips 82 are mounted with adequate color filters and an optical system similar to that shown in Figs. 1 and 2. The electron gun is similar to the one shown in Fig. 1 with vertical deflection plates and a cathode beam control in the gun assembly. Line sequential signals are reproduced by first scanning the top red fluorescent strip 82—1. Then the green and blue strips 82—2, 82—3, in that order, and then the second red strip 82—4 and so on till all the nine strips have been scanned. The voltage necessary for this procedure is shown in the curve of Fig. 11 which is similar to the curve of Fig. 3. The highest positive value 83—1 corresponds to strip 82—1, the next 83—2 corresponds to strip 82—2, the time interval of each voltage level being equal to the scanning time of one picture line.

Figure 7:
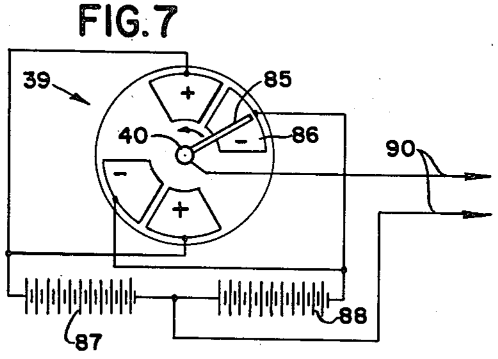
Fig. 7 is a schematic diagram of connections of a commutator arrangement which may be attached to the shaft of a rotating mirror and which produces the type of voltage wave shown in Fig. 3.

The voltage waves shown in Figs. 3 and 11 may be produced in a number of ways. A series of trigger stages controlled by a portion of the line or frame control wave will produce either wave. Also, a commutating device 39 as illustrated in schematic manner in Fig. 7 can be used. This device may be coupled to shaft 40 run by the mirror motor 42, or it may be geared to the shaft and run at some other speed. An arm 85 is secured to shaft 40 and sweeps over the sectors 86. One form of this commutator device comprises a contact means on the arm to make contact with the sectors. Another form of the device comprises the mounting of the arm 85 so that it swings close to the sectors but does not touch them. A divided source of potential such as batteries 87 and 88 furnish the voltages which are supplied over two conductors 90 to the deflecting electrodes in the picture tube. When contact is made by the rotating arm 85 the deflecting electrodes are given the same potential as produced by the batteries. When the capacity between the rotating arm and the sectors is relied upon to transmit a charge, the voltages provided by the source of potential must be somewhat larger. It will be evident that the correct vertical positioning of the cathode beam is not necessary. A small overlapping of the beam is usually provided so that the beam may move a slight distance in the vertical direction without disturbing the picture values.

A similar commutator device may be used to produce the eight voltage steps necessary to supply the vertical deflection plates of the tube shown in Figs. 9 and 10.

In the above descriptions the light from the fluorescent screens has been taken from the side opposite the electron gun. It will be obvious that a similar optical system could be devised to focus the light given off by the fluorescent screens from the same side as the electron gun.

From the above description it will be evident that the invention provides a novel form of color television reproduction which includes a novel tube and a cooperating optical system to focus the light values on a projection screen. The device may be used to receive and project color pictures broadcast in any one of the four proposed systems.

While there have been described and illustrated specific embodiments of the invention, it will be obvious that various changes and modifications may be made therein without departing from the field of the invention which should be limited only by the scope of the appended claims.

I claim:

1. A color television receiving system comprising, a cathode ray tube for transforming received video signals into bands of colored light, an electron gun at one end of the cathode ray tube for producing electrons focussed to a vertical line at the other end of the tube, three fluorescent screens at the other end of said tube, a condensing optical system which includes three cylindrical field lenses and a cylindrical object lens for focussing light from the three fluorescent screens onto a slit diaphragm; and a focussing optical system which includes a cylindrical object lens, a spherical focussing lens, and a rotating mirror for focussing and spreading the image of the slit onto a projection screen.

2. A color television receiving system comprising, a cathode ray tube for transforming received video signals into bands of colored light, an electron gun at one end of the cathode ray tube for producing electrons focussed to a vertical line at the other end of the tube, three fluorescent screens at the other end of said tube, said screens disposed in mutually parallel arrangement and mounted for scanning by electrons produced by the electron gun, a condensing optical system which includes three cylindrical field lenses and a cylindrical object lens for focussing light from the three flourescent screens onto a slit diaphragm; and a focussing optical system which includes a cylindrical object lens, a spherical focussing lens, and a rotating mirror for focussing and spreading the image of the slit onto a projection screen.

3. A color television receiving system for projecting color pictures on a screen comprising, a cathode ray tube for transforming received video signals into bands of colored light, an electron gun at one end of the cathode ray tube for producing electrons focussed to a vertical line at the other end of the tube, three fluorescent screens at the other end of said tube, said screens disposed in horizontal mutually parallel arrangement and mounted for scanning by the vertical line-focussed electrons; a condensing optical system which includes three cylindrical field lenses, one for each fluorescent screen, and a cylindrical object lens for focussing light from said screens onto a horizontal slit diaphragm; and a focussing optical system which includes two cylindrical lenses disposed at right angles to each other, a spherical focussing lens, and a rotating mirror for focussing and spreading the image of the slit onto a projection screen.

4. A color television receiving system for projecting color pictures on a screen comprising, a cathode ray tube for transforming received video signals into bands of colored light, an electron gun at one end of the cathode ray tube for producing electrons focussed to a vertical line at the other end of the tube, three fluorescent screens mounted on the end of the cathode ray tube opposite the electron gun, said screens disposed in mutually parallel arrangement, and positioned for simultaneous scanning of the electrons from said gun; a condensing optical system which includes one or more cylindrical field lenses and a cylindrical object lens for focussing light from the three fluorescent screens onto a slit diaphragm, a focussing optical system for focussing the light passing through the slit diaphragm and a rotating mirror for spreading the image of the slit onto a projection screen.

5. A color television receiving system for projecting color pictures on a screen comprising, a cathode ray tube for transforming received video signals into bands of colored light, an electron gun at one end of the cathode ray tube for producing electrons focussed to a vertical line at the other end of the tube, three fluorescent screens mounted on the end of the cathode ray tube opposite the electron gun, said screens disposed in mutually parallel arrangement and positioned for simultaneous scanning of the electrons from said gun; a condensing optical system which includes three cylindrical field lenses, one for each fluorescent screen, and a cylindrical object lens for focussing light from said screens onto a slit diaphragm; and a focussing optical system which includes two cylindrical lenses disposed at right angles to each other, a spherical focussing lens, and a rotating mirror for focussing and spreading the image of the slit onto a projection screen.

6. A color television receiving system for projecting color pictures on a screen comprising, a cathode ray tube for transforming received video signals into bands of colored light, an electron gun at one end of the cathode ray tube for producing a steady stream of electrons focussed to a vertical line at the other end of the tube, three fluorescent screens mounted on the end of the cathode ray tube opposite the electron gun, three control electrodes mounted in front of the fluorescent screens for controlling the cathode beam intensity, said screens disposed in mutually parallel arrangement and positioned fo simultaneous scanning of the electrons from said gun; a condensing optical system which includes three cylindrical field lenses, one for each fluorescent screen, and a cylindrical object lens for focussing light from said screens onto a slit diaphragm; and a focussing optical system which includes two cylindrical lenses disposed at right angles to each other, a spherical focussing lens, and a rotating mirror for focussing and spreading the image of the slit onto a projection screen.

SOLO S. ROTH.

REFERENCES CITED

The following references are of record in the file of this patent:

UNITED STATES PATENTS

| Number | Name | Date |
|---|---|---|
| 2,173,476 | Goldmark | Sept. 19, 1939 |
| 2,265,657 | Von Ardenne | Dec. 9, 1941 |

FOREIGN PATENTS

| Number | Country | Date |
|---|---|---|
| 109,234 | Australia | Dec. 14, 1939 |